(12) United States Patent
Carroll

(10) Patent No.: US 7,714,260 B2
(45) Date of Patent: May 11, 2010

(54) STACKABLE HELIOSTAT FRAME STRUCTURE

(75) Inventor: Joseph P. Carroll, Moorpark, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 55 days.

(21) Appl. No.: 11/693,950

(22) Filed: Mar. 30, 2007

(65) Prior Publication Data

US 2008/0237454 A1   Oct. 2, 2008

(51) Int. Cl.
*G01C 21/02*   (2006.01)
*F24J 2/46*    (2006.01)
*G03B 21/00*   (2006.01)

(52) U.S. Cl. .................. 250/203.4; 126/704; 353/3
(58) Field of Classification Search ............. 250/203.4; 126/704–708; 353/3
See application file for complete search history.

(56) References Cited

U.S. PATENT DOCUMENTS

| | | | |
|---|---|---|---|
| 4,105,117 A * | 8/1978 | Atkin et al. ................ 206/501 |
| 4,110,010 A | 8/1978 | Hilton | |
| 4,192,583 A | 3/1980 | Horton | |
| 4,209,231 A | 6/1980 | Sayre | |
| 4,209,236 A | 6/1980 | Horton et al. | |
| 4,218,114 A | 8/1980 | Bunch | |
| 4,265,461 A * | 5/1981 | Okubo ...................... 280/1.13 |
| 4,266,530 A * | 5/1981 | Steadman .................. 126/602 |
| 4,394,859 A | 7/1983 | Drost | |
| 4,402,582 A | 9/1983 | Rhodes | |
| 4,466,423 A | 8/1984 | Dolan et al. | |
| 4,471,764 A * | 9/1984 | Calvert et al. ............... 126/704 |
| 4,488,779 A | 12/1984 | Varner | |
| 4,620,382 A | 11/1986 | Sallis | |
| 4,741,609 A | 5/1988 | Sallis | |
| 4,930,493 A | 6/1990 | Sallis | |
| 5,027,047 A | 6/1991 | Logan et al. | |
| 5,852,896 A * | 12/1998 | Flasch, Jr. ..................... 47/79 |
| 6,080,927 A | 6/2000 | Johnson | |
| 6,353,421 B1 * | 3/2002 | Lalezari et al. ............. 343/915 |
| 6,485,152 B2 * | 11/2002 | Wood ......................... 359/853 |
| 6,532,953 B1 | 3/2003 | Blackmon et al. | |
| 6,959,993 B2 | 11/2005 | Gross et al. | |
| 6,984,050 B2 | 1/2006 | Nakamura | |
| 7,115,851 B2 | 10/2006 | Zhang | |
| 2004/0144055 A1 * | 7/2004 | Lewison ....................... 52/633 |
| 2006/0118105 A1 | 6/2006 | Hon | |
| 2008/0092877 A1 * | 4/2008 | Monsebroten ............. 126/683 |

OTHER PUBLICATIONS

PCT International Search Report and Written Opinion, mailed Aug. 6, 2008.

* cited by examiner

*Primary Examiner*—Thanh X Luu
(74) *Attorney, Agent, or Firm*—Carlson, Gaskey & Olds PC

(57) ABSTRACT

A heliostat includes a pedestal, a transmission system, a heliostat frame assembly, and a mirror assembly. The heliostat frame assembly generally includes a first heliostat frame set and a second heliostat frame set mounted to the transmission system which is mounted upon the pedestal. Each heliostat frame set includes a stackable heliostat inner frame assembly and a stackable heliostat outer frame assembly. Each stackable heliostat inner frame assembly is identical and each stackable heliostat outer frame assembly is identical such that a multiple of heliostat inner frames and a multiple of heliostat outer frames are readily stackable in a nested arrangement for storage and transport.

14 Claims, 4 Drawing Sheets

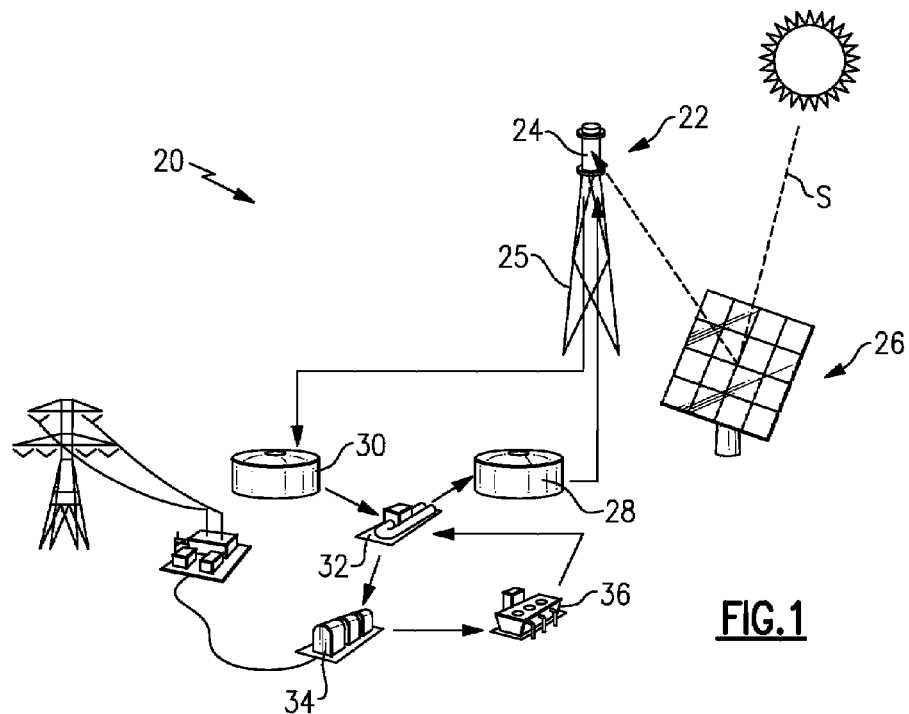
FIG.1
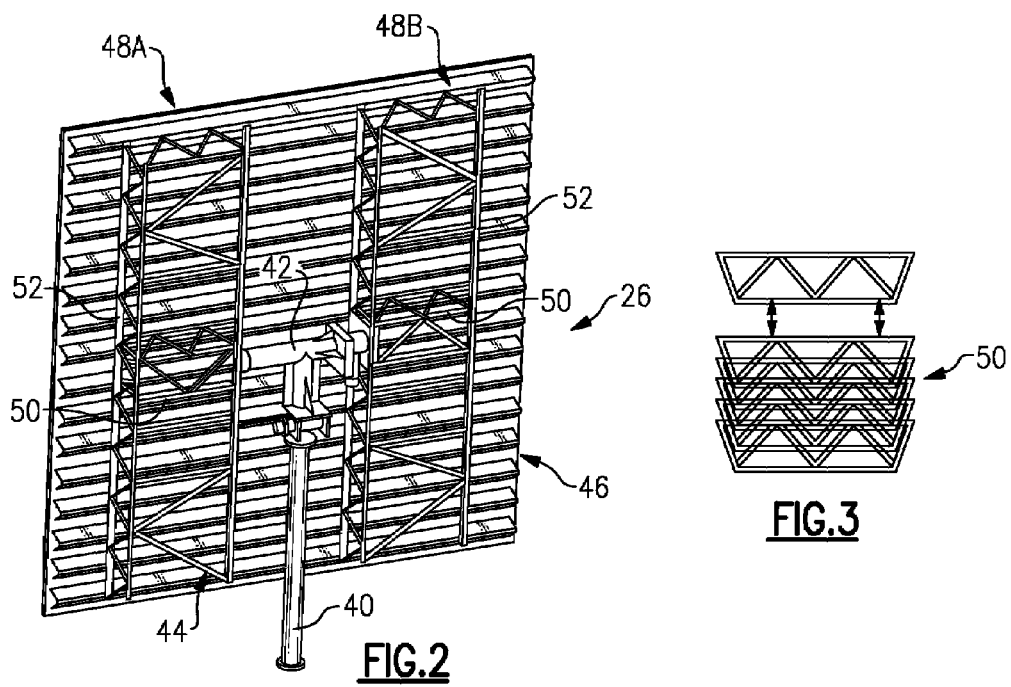
FIG.2
FIG.3

STACKABLE HELIOSTAT FRAME STRUCTURE

BACKGROUND OF THE INVENTION

The present invention relates to a heliostat structure, and more particularly to a stackable heliostat frame assembly which increases packaging efficiency during transport.

Heliostats are mirror structures that direct the sun's energy to a central receiver to produce electric power. The heliostat and central receiver are often referred to as a solar power tower system. A solar power tower system capable of producing 100 megawatts electric power may require approximately 40,000 16 ft×16 ft heliostats. These heliostats may be a significant cost of the solar power tower system.

Conventional heliostats include a heliostat frame and torque tube structure that are constructed on-site of the heliostat field. Such a field is typically located in hot desert conditions. Construction of conventional heliostats in this environment may further increase the on-site assembly costs.

Accordingly, it is desirable to provide a heliostat structure which is constructed in a manner which increases packaging efficiency for transport yet decreases on-site assembly costs.

SUMMARY OF THE INVENTION

The heliostat according to the present invention includes a stackable frame assembly. The heliostat generally includes a pedestal, a transmission system, a frame assembly, and a mirror assembly. The frame assembly generally includes a first heliostat frame set and a second heliostat frame set on the pedestal mounted transmission system. Each heliostat frame set includes a stackable heliostat inner frame assembly and a stackable heliostat outer frame assembly. Each stackable heliostat inner frame assembly is identical and each stackable heliostat outer frame assembly is identical such that a multiple of heliostat inner frames and a multiple of heliostat outer frames are readily stackable in a nested arrangement for storage and transport.

The heliostat is assembled from the stackable heliostat inner and heliostat outer frame assemblies by aligning and mounting one stackable heliostat inner frame assembly within one stackable heliostat outer frame assembly. The mirror assembly is then assembled to the frame assembly.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1 is a general schematic view of a solar power tower system for use with the present invention;

FIG. 2 is a perspective view of a heliostat;

FIG. 3 is a perspective view of a stack of stackable heliostat inner frame assemblies in a nested arrangement for storage and transport;

DETAILED DESCRIPTION OF THE DISCLOSED EMBODIMENT

Figure 4:
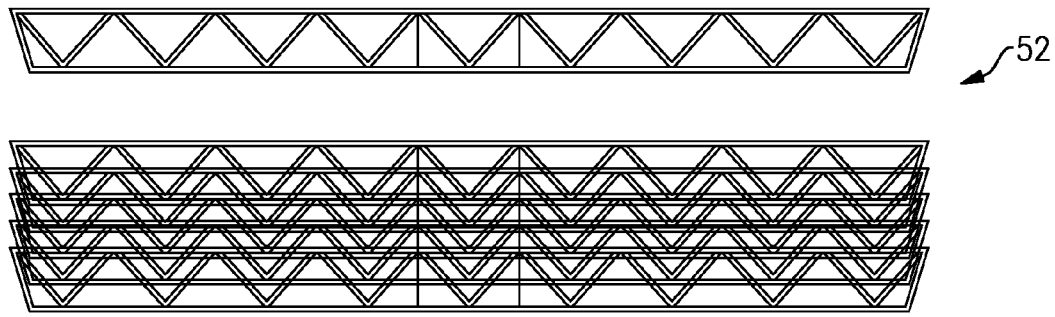
FIG. 4 is a perspective view of a stack of stackable heliostat outer frame assemblies in a nested arrangement for storage and transport.

Referring to FIG. 1, a solar power tower system 20 includes a high concentration central receiver system 22 having a reflector assembly 24 coupled to a tower structure 25 at a predetermined height above ground to receive solar radiation S. Thousands of sun-tracking mirrors or heliostats 26 reflect solar radiation S onto the reflector assembly 24. A solar power tower system 20 capable of producing 100 megawatts of electric power may require approximately 40,000 16 ft×16 ft heliostats 26.

Molten salt or other thermal transfer fluid is communicated from a cold storage tank system 28 through the central receiver system 22 where it is heated. The heated thermal transfer fluid is then communicated to a hot storage tank system 30. When power is required, the hot thermal transfer fluid is pumped to a steam generator system 32 that produces steam. The steam drives a steam turbine/generator system 34 that creates electricity for communication to a power grid. From the steam generator, the thermal transfer fluid is returned through a condenser system 36 to the cold storage tank system 28, where it is stored and eventually reheated in the central receiver system 22. It should be understood that although a particular component arrangement is disclosed in the illustrated embodiment, any arrangement which utilizes heliostats will also benefit from the present invention.

Referring to FIG. 2, the heliostat 26 generally includes a pedestal 40, a transmission system 42, a frame assembly 44, and a mirror assembly 46. The pedestal 40 supports the transmission system 42 which articulates the mirror assembly 46 to track the sun and focus the solar radiation S onto the reflector assembly 24.

The frame assembly 44 generally includes a first heliostat frame set 48A and a second heliostat frame set 48B mounted to the transmission system 42. Each heliostat frame set 48A, 48B includes a stackable heliostat inner frame assembly 50 and a stackable heliostat outer frame assembly 52. Each stackable heliostat inner frame assembly 50 is identical and each stackable heliostat outer frame assembly 52 is identical such that a multiple of heliostat inner frames 50 (FIG. 3) and a multiple of heliostat outer frames (FIG. 4) are readily stackable in a nested arrangement for storage and transport.

Figure 5:
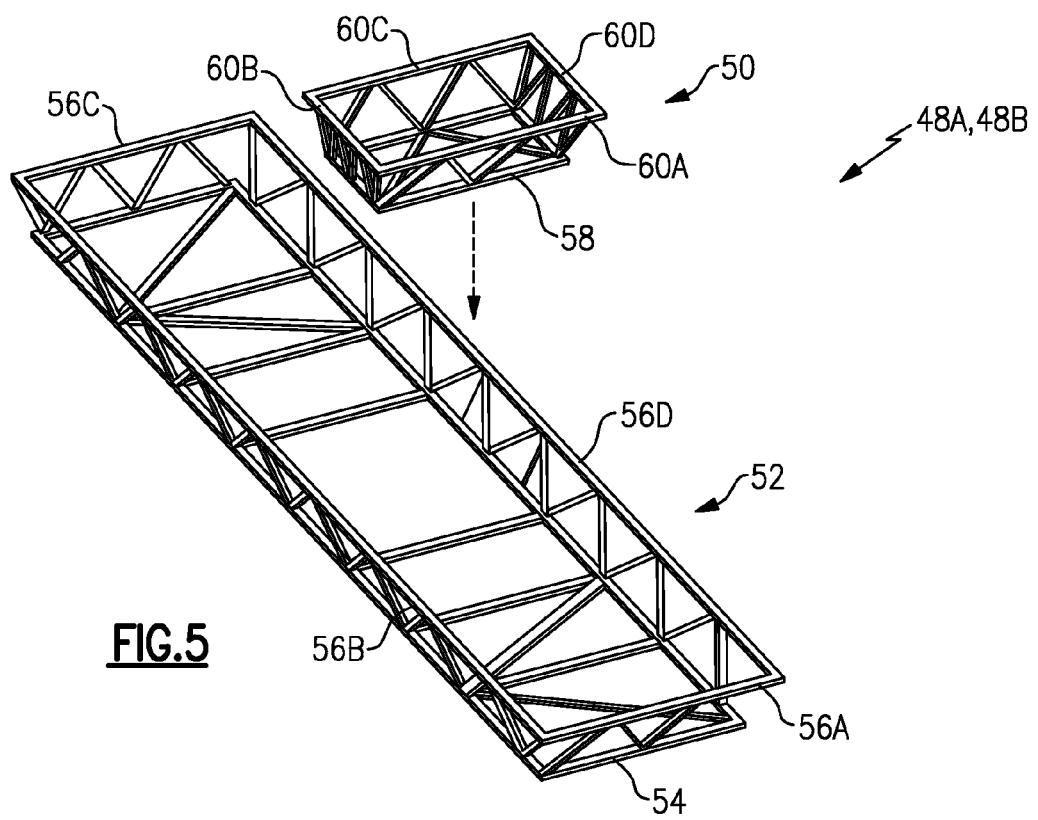
FIG. 5 is an expanded perspective view of a heliostat frame assembly.

Referring to FIG. 5, the stackable heliostat inner frame assembly 50 and the stackable heliostat outer frame assembly 52 are generally of a trapezoidal shape in cross-section. The stackable heliostat outer frame assembly 52 includes a rectilinear back frame 54 and four side frames 56A-56D to define a basket-like configuration. The stackable heliostat inner frame assembly 50 likewise generally includes a rectilinear back frame 58 and four side frames 60A-60D to define a basket-like configuration sized to mount within the stackable heliostat outer frame assembly 52. The four side frames 56A-56D, 60A-60D each define an obtuse angle relative the respective rectilinear back frame 54, 58. It should be understood that various support members in various arrangements may be utilized within each assembly 50, 52 and that particular geometry of each side and may be of various forms.

Figure 6:
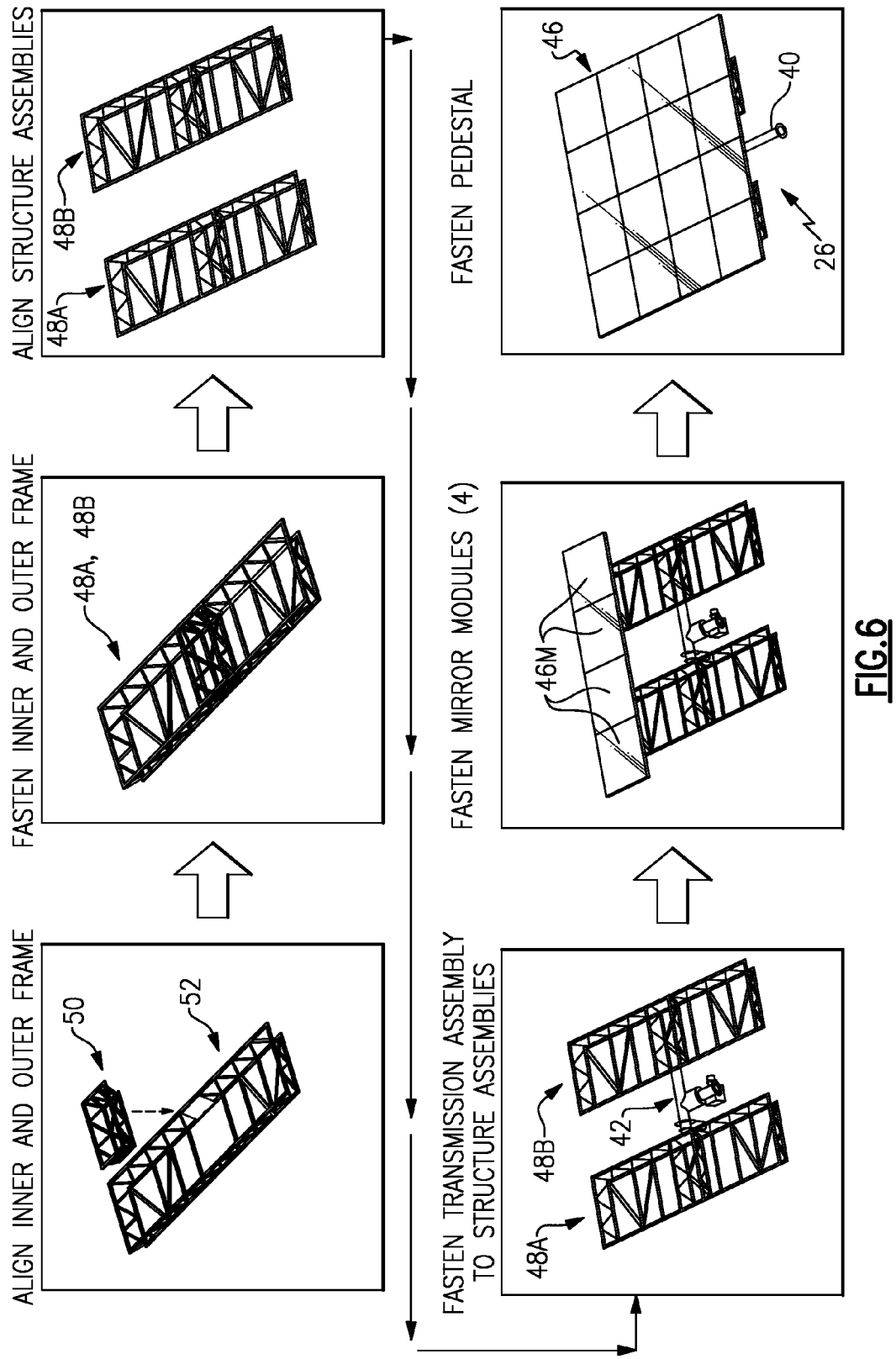
FIG. 6 is a schematic representation of an assembly method for the heliostat.

Referring to FIG. 6, the heliostat 26 is assembled from the generally identical stackable heliostat inner frame assemblies 50 and the generally identical stackable heliostat outer frame assemblies 52 by aligning and mounting one stackable heliostat inner frame assembly 50 within one stackable heliostat outer frame assembly 52. It should be understood that permanent assembly such as welding and/or nonpermanent assembly such as bolting may be utilized. Once the two heliostat frame sets 48A, 48B are assembled, the transmission system 42 is attached therebetween. Notably, the stackable heliostat inner frame assemblies 50 replace a conventional torque tube assembly as the main structural support. The mirror assembly 46 is assembled from a multiple of mirror modules 46M which are mounted to the heliostat frame assembly 44. This assembly can be readily performed in a building adjacent to the heliostat field.

Figure 7:
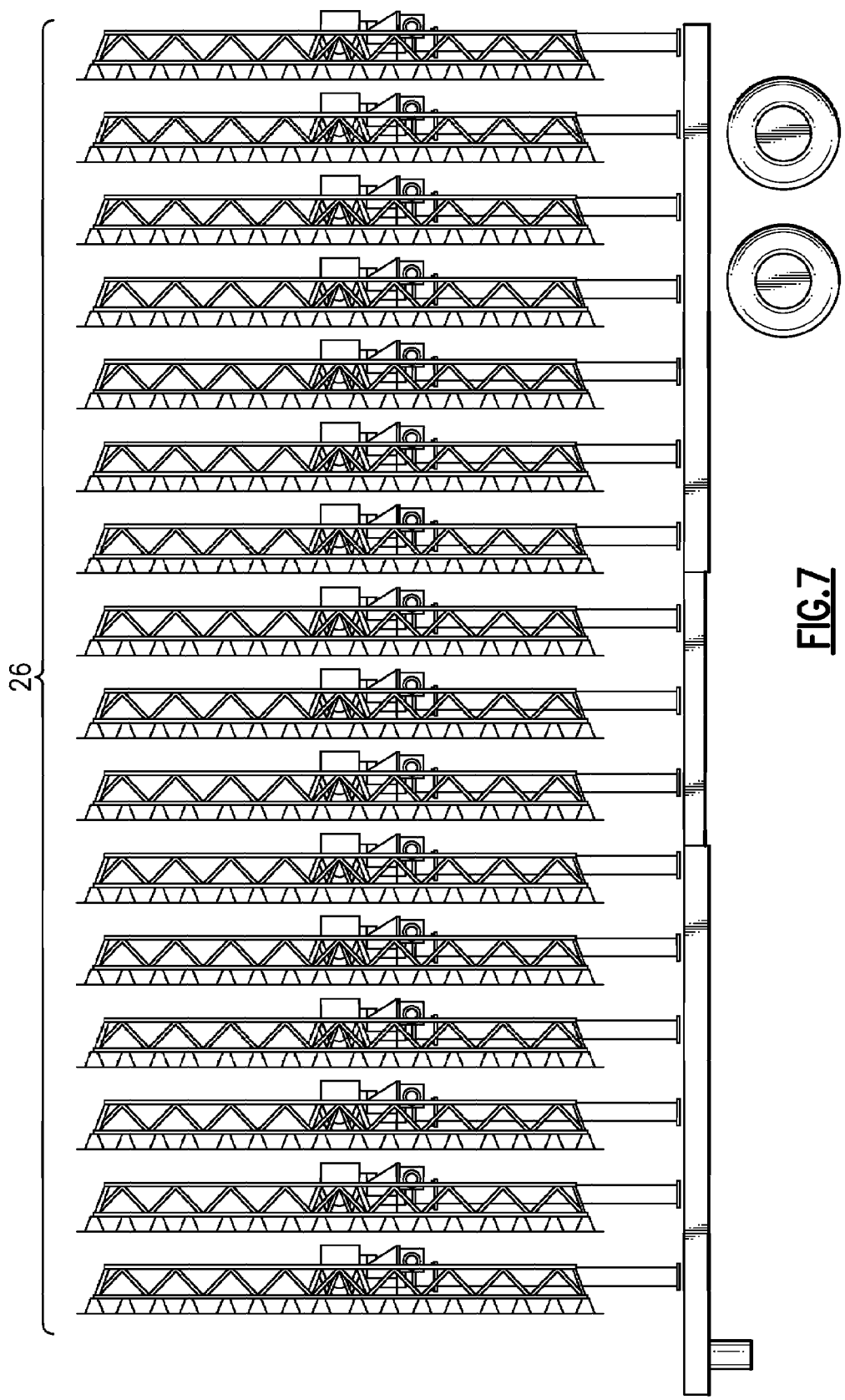
FIG. 7 is a schematic representation of a multiple of heliostats arranged on a truck bed for transport.

The heliostat 26 is quite compact when articulated to the vertical such that a relatively significant number thereof—24 in the disclosed embodiment—are readily transported on, for example, a flat bed truck (FIG. 7).

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed herein, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A heliostat comprising:
   a heliostat frame assembly including at least one stackable heliostat inner frame assembly mountable to a stackable heliostat outer frame assembly, said heliostat frame assembly includes a first heliostat frame set having a first stackable heliostat inner frame assembly and a first stackable heliostat outer frame assembly and a second heliostat frame set having a second stackable heliostat inner frame assembly and a second stackable heliostat outer frame assembly, said first stackable heliostat inner frame assembly stackable at least partially within said second stackable heliostat inner frame assembly and said first stackable heliostat outer frame assembly stackable at least partially within said second stackable heliostat outer frame assembly; and
   a transmission system mountable to said first stackable heliostat inner frame assembly and said second stackable inner frame assembly, said transmission system operable to position a mirror assembly mounted to said first heliostat frame set and said second heliostat frame set.

2. The heliostat as recited in claim 1, wherein said first heliostat frame set is generally parallel to said second heliostat frame set.

3. The heliostat as recited in claim 1, wherein said stackable heliostat inner frame assembly and said stackable heliostat outer frame assembly are generally trapezoidal shaped in cross-section.

4. The heliostat as recited in claim 1, wherein said stackable heliostat inner frame assembly and said stackable heliostat outer frame assembly each include a rectilinear back frame and four side frames to define a basket-like configuration.

5. The heliostat as recited in claim 1, wherein said stackable heliostat inner frame assembly mounts at least partially within said stackable heliostat outer frame assembly.

6. The heliostat as recited in claim 1, wherein said stackable heliostat inner frame assembly and said stackable heliostat outer frame assembly each include a rectilinear back frame and four side frames, each of said side frames define an obtuse angle relative said respective rectilinear back frame.

7. The heliostat as recited in claim 1, wherein said at least one stackable heliostat inner frame assembly is mountable to a center section of a said stackable heliostat outer frame assembly.

8. A heliostat comprising:
   a first heliostat frame set having a first stackable heliostat inner frame assembly and a first stackable heliostat outer frame assembly;
   a second heliostat frame set having a second stackable heliostat inner frame assembly and a second stackable heliostat outer frame assembly, said first stackable heliostat inner frame assembly stackable at least partially within said second stackable heliostat inner frame assembly and said first stackable heliostat outer frame assembly stackable at least partially within said second stackable heliostat outer frame assembly; and
   a transmission system mountable to said first stackable heliostat inner frame assembly and said second stackable heliostat inner frame assembly, said transmission system operable to position a mirror assembly mounted to said first frame set and said second frame set.

9. The heliostat as recited in claim 8, wherein said first heliostat frame set is generally parallel to said second heliostat frame set.

10. The heliostat as recited in claim 8, wherein said stackable heliostat inner frame assembly and said stackable heliostat outer frame assembly are generally trapezoidal shaped in cross-section.

11. The heliostat as recited in claim 8, wherein said stackable heliostat inner frame assembly and said stackable heliostat outer frame assembly each include a rectilinear back frame and four side frames to define a basket-like configuration.

12. The heliostat as recited in claim 8, wherein said stackable heliostat inner frame assembly mounts at least partially within said stackable heliostat outer frame assembly.

13. The heliostat as recited in claim 8, wherein said stackable heliostat inner frame assembly and said stackable heliostat outer frame assembly each include a rectilinear back frame and four side frames, each of said side frames define an obtuse angle relative said respective rectilinear back frame.

14. A method of assembling a heliostat comprising the steps of:
   (A) unstacking at least one stackable heliostat inner frame assembly from a multiple of stackable heliostat inner frame assemblies;
   (B) unstacking at least one stackable heliostat outer frame assembly from a multiple of heliostat outer frame assemblies;
   (C) nesting the at least one stackable heliostat inner frame assembly at least partially within a central section of the at least one stackable heliostat outer frame assembly to assemble a first heliostat frame set;
   (D) unstacking at least one stackable heliostat inner frame assembly from the multiple of stackable heliostat inner frame assemblies;

(E) unstacking at least one stackable heliostat outer frame assembly from the multiple of heliostat outer frame assemblies; and
(F) mounting the at least one stackable heliostat inner frame assembly at least partially within the at least one stackable heliostat outer frame assembly to assemble a second heliostat frame set; and
(G) mounting a transmission system between the first heliostat frame set and the second heliostat frame set; and
(H) mounting a mirror assembly to the first heliostat frame set and the second heliostat frame set.

* * * * *